United States Patent [19]
Hanrihan

[11] 3,778,634
[45] Dec. 11, 1973

[54] POWER SUPPLY WITH BATTERY BACKUP

[75] Inventor: James P. Hanrihan, Wrentham, Mass.

[73] Assignee: The Foxboro Company, Foxboro, Mass.

[22] Filed: May 18, 1973

[21] Appl. No.: 361,677

[52] U.S. Cl. .................................. 307/64, 307/66
[51] Int. Cl. .............................................. H02j 9/00
[58] Field of Search ................... 307/51, 64, 66, 85; 321/27 R

[56] References Cited
UNITED STATES PATENTS

| | | |
|---|---|---|
| 3,196,336 | 7/1965 | Schmidt ........................... 321/47 X |
| 3,293,530 | 12/1966 | Baude .............................. 307/66 X |
| 3,339,080 | 8/1967 | Howald ............................... 307/66 |
| 3,373,313 | 3/1968 | Prines et al. ...................... 307/64 X |
| 3,509,357 | 4/1970 | Studtmann ......................... 307/64 |
| 3,614,461 | 10/1971 | Speer .................................. 307/64 |
| 3,703,644 | 11/1972 | Thorborg ............................ 307/64 |

*Primary Examiner*—William M. Shoop, Jr.
*Attorney*—Norman E. Brunell

[57] ABSTRACT

A power supply configuration is shown which provides for the addition of battery backup capabilities without unnecessary conversions or hardware. This configuration includes logic circuitry for automatically activating the backup unit in case of line voltage failure while disabling the backup unit in case of a short circuit.

8 Claims, 1 Drawing Figure

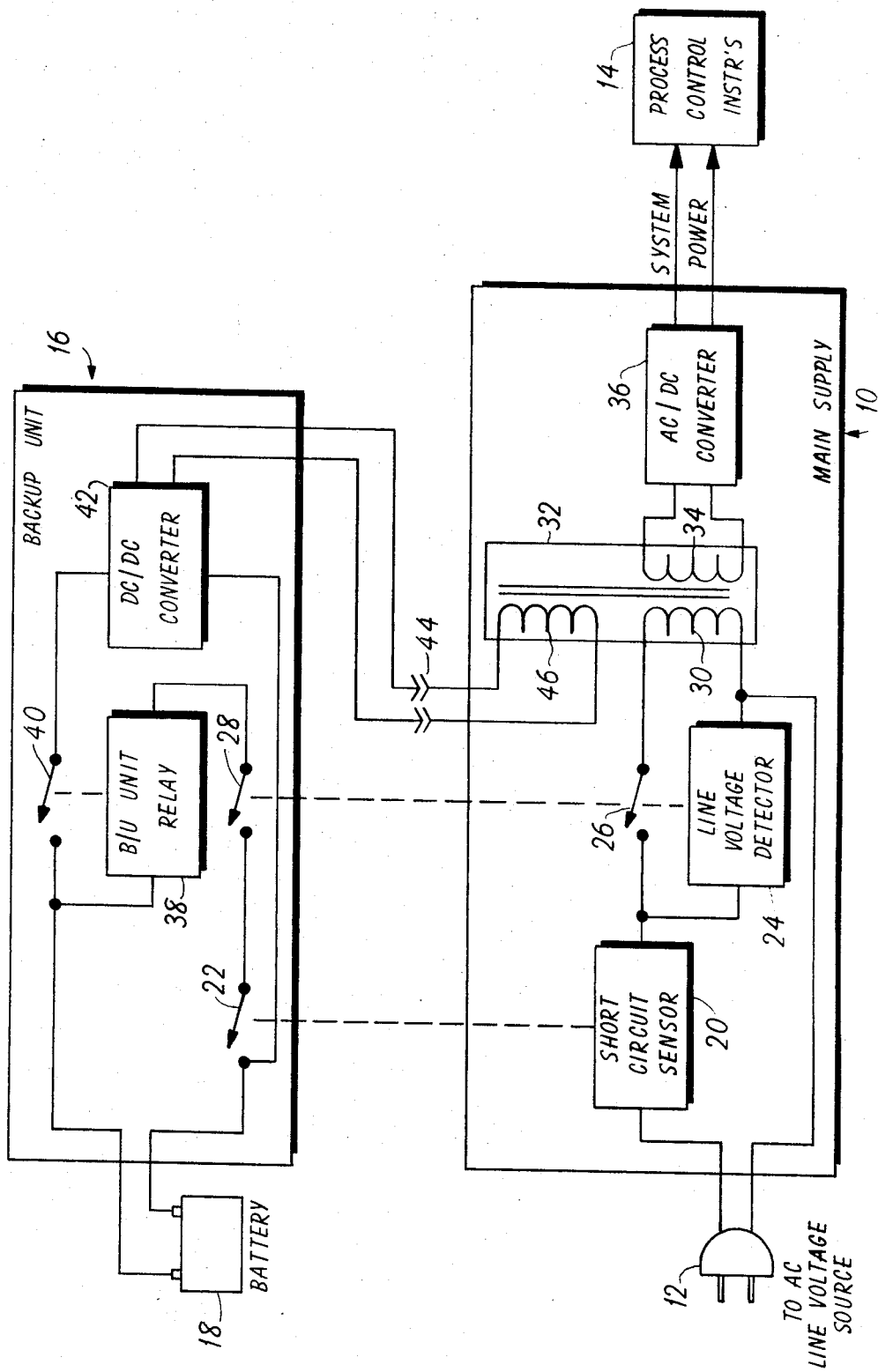

3,778,634

POWER SUPPLY WITH BATTERY BACKUP

BACKGROUND OF THE INVENTION

1. Field of the Invention

This invention relates to power supplies used to convert AC line voltage to various DC voltages, herein designated generally as system power, for use by other equipment. In particular this invention relates to power supplies used with equipment that cannot tolerate disruption of the DC or system power from disturbances present in the AC line voltage. Such systems must provide an alternate source of power in case of failure of the AC line source. This is usually accomplished by utilizing batteries, in what is commonly called a battery backup unit.

A good example of system sensitive to power disruption is a process control instrumentation system. Systems of this type have final operators, such as valves, that cooperate with the process to be controlled. These operators are manipulated by electronic instrumentation, such as isolators, multipliers, and controllers, to control process parameters in response to signals from process monitoring sensors. Disruption of the supply of system power to these devices due to line voltage failure would cause loss of process control. Disruption of process control often must be avoided for even short periods of time to prevent loss of the product. In certain situations loss of process control could even result in explosions.

This invention in particular relates to the configuration of such power supplies that enables them to accept backup power from an alternate DC source, such as a battery, in order to provide system power without disruption. This invention also relates to the switching systems used to detect line source failure and activate the battery backup mode.

2. Description of the Prior Art

There are three conventional methods of connecting battery backup to a power supply providing DC system power.

In the first method the power supply load is connected directly to a battery of appropriate DC voltage during line voltage failure. This simple approach is not usually feasible in large systems because system power is required at many different levels. It is extremely inefficient to provide different voltage levels directly from the same battery. In addition control instrumentation requires highly regulated system power. Raw battery power would, therefore, not be acceptable for most applications.

Detection of line voltage failure and activation of the battery backup unit is accomplished easily in such simple systems by putting a diode in series with the battery backup unit. This diode is backed-biased when system power is available from the AC source and allows current to flow out of the battery only when the AC supply power is not available. A major disadvantage to such a diode switching arrangement is that a great deal of power is lost across the diode when the battery is being used. For example, if a typical DC source of 24 volts is utilized the power loss is approximately 5 percent because the voltage drop across a power diode of this type is usually 1 volt.

The second and more common configuration of power supply that haas backup capabilities requires that the AC line voltage be converted to a DC voltage at the same level as the battery. This DC voltage is then converted to system power. This configuration allows one battery to be utilized for many levels of system power. Its major disadvantage, however, is that an extra unnecessary conversion, from line voltage to battery voltage, before conversion to system voltage is required resulting in unnecessary power loss and extra hardware.

In configurations of this sort line voltage failure detection is usually accomplished by a relay positioned in parallel with the line voltage source, the contacts of which are used to activate the battery backup unit when line voltage drops below a predetermined setting.

A major problem associated with such conventional switching systems is that conventional line voltage failure detection techniques do not distinquish between true line voltage failure and the loading effect of a short circuit in the power supply. Therefore, when line voltage is available but a short circuit has occurred in the power supply, the line voltage detector will detect a drop in the detected level of system power and activate the battery backup unit. This will cause the battery to be needlessly drained by being connected to the short circuit.

The third conventional configuration, instead of converting the AC line voltage to battery level DC voltage, converts the DC voltage from the battery backup source to an AC voltage at the same level as the AC line voltage source. In this way, when AC line voltage is not available from the usual source, a substitute AC line voltage originating from the battery is available. This configuration is convenient in that it does not require modification of the regular power supply to add backup capability. It does, however, require that the battery voltage be converted to AC line voltage.

This additional conversion presents two major disadvantages. The first disadvantage results from the cascading of the conversions. By converting from battery voltage to AC and then reconverting to system power the inherent inefficiencies, or power losses, are also cascaded. If each conversion is 70 percent efficient the resultant overall efficiency from battery to system power is less than 50 percent. Half the battery power provided is therefore wasted. The second disadvantage is that the extra conversion requires an extra power transformer of the same size and capacity as the main power transformer used to convert the AC to DC for system power. This disadvantage is important from an economic standpoint because these transformers constitute a considerable portion of hardware cost of the power supply system.

SUMMARY OF THE INVENTION

It is therefore an object of the instant invention to provide an improved power supply having battery backup capabilities that avoid the disadvantages enumerated above. It is a further object to provide a supply that is efficient in terms of initial hardware cost and operating power loss when used with or without the battery backup capability. It is a still further object to provide a supply that is efficient in terms of operating power loss when used in the battery backup mode as well as when used in the normal operating mode. It is a still further object to provide a power supply battery backup that can provide various system power voltages from one battery voltage. It is a particular object of the instant invention to provide a supply that will automatically transfer from the normal operating mode to a battery backup mode in case of line source failure. It is a further particular object of the instant invention to provide a suppy that is able to distinguish between true line source failure and the apparent failure signified by a drop in voltage resulting from the loading effect of a short circuit in the power supply. It is a still further particular object of the instant invention to provide a supply that will disable the battery backup unit when a short circuit appears in the system. These and other objects of the instant invention are accomplished by the design described below in which a battery backup unit is added to a simple AC supply by providing a DC square wave from the battery to an additional primary winding of the main power transformer. In addition, a logic circuit is provided which activates the battery backup unit when line voltage decreases below a preset minimum, but disables the backup unit if line current increases above a certain maximum, thereby preventing activation of the backup unit when a short circuit is present.

BRIEF DESCRIPTION OF THE DRAWING

The FIGURE is a block diagram of preferred embodiment of a power supply according to the instant invention.

DETAILED DESCRIPTION OF A PREFERRED EMBODIMENT

The invention will be described with reference to the Figure which shows a simplified block diagram — like schematic of a complete supply, including a battery backup unit according to the instant invention. This block diagram is used to point out the relationship between the functional parts of the backup unit and the main power supply. In the Figure, main supply 10 derives its power from an AC line voltage source not shown. This AC power is manipulated by power supply 10 and converted to a DC voltage used as system power and applied via cable or buss to process control instruments 14.

Battery backup unit 16 drives its power from a battery or other DC source depicted as battery 18. During the backup mode this DC voltage is converted to a chopped DC voltage, not necessarily the same as the line source voltage, and is applied to the main transformer within main supply 10. This AC voltage is then converted to system power and applied to process control instruments 14.

Within main supply 10 short circuit sensor 20 is used to monitor the line current supplied thru connector 12 from the AC line source. Short circuit sensor 20 controls disabling switch 22 to prevent the battery backup unit from supplying power to the main supply if the line current is above a predetermined maximum even if line voltage falls below the predetermined minimum because this drop in line voltage would be due to the loading effect of a short circuit. Sensor 20 may conveniently be a simple circuit breaker having an extra set of contacts used as disabling switch 22.

Line voltage detector 24 monitors the voltage applied to connector 12. The coil of a conventional relay may be used for this purpose. It is only necessary to adjust the pull in voltage of the coil used as detector 24 so that isolation switch 26 is maintained in a closed position as long as the line voltage remains above the minimum required to supply system power. When a line voltage failure occurs detector 24 causes isolation 26 to open. This disconnects the line voltage source from the remainder of main supply 10.

At the same time detector 24 activates backup switch 28 which may conveniently be an extra set of contacts associated with the relay coil. The effect of activating switch 28 will be discussed below after the explanation of the function of the remainder of main supply 10. If isolation switch 26 is closed by detector 24 AC line voltage above the proper minimum value is applied to winding 30 of transformer 32. Winding 30 is a primary winding of transformer 32 and AC line voltage applied to it induces an AC voltage of a different level in secondary winding 34. The voltage induced in the secondary winding is converted to DC by means of AC/DC converter 36. This converter serves the function of rectifying and regulating the AC voltage so that any conventional converter may be used. The DC voltage resulting at the output of converter 36 is system power and is applied to process control instruments 14, as discussed herein above.

Referring now to backup unit 16, if no short circuit is sensed so that disabling switch 22 is in a closed position and if line voltage has dropped below the predetermined minimum so that line voltage detector 24 has closed backup switch 28, battery voltage is applied across backup unit relay 38. Energization of this relay causes isolation switch 40 to be closed. Therefore, under conditions of line voltage failure, the voltage across battery 18 is applied to DC/AC Converter 42, which may simply be a chopper that converts the DC battery voltage into a square wave. This square wave is applied to the main supply thru connector 44 to a second primary winding 46 of transformer 32.

Under the conditions described immediately above the chopped DC voltage applied to transformer 32 from the battery will induce an AC voltage in secondary winding 34 which may then be converted to system power in the same way that the AC voltage originating from the line voltage source was converted to system power.

Isolation switches 26 and 40, in the main supply and backup unit respectively, are needed to prevent interaction between the battery and the AC line source. For example, in the backup mode, the chopped DC voltage applied to winding 46 from the battery also appears across primary winding 30 because the windings are part of the same transformer. If isolation switch 26 was closed or not present, the power from the battery would be sent back thru connector 12 to whatever other loads the AC line source is connected. This would, of course, immediately drain battery 18. Isolation switch 40 in backup unit 16 performs approximately the same function of protecting the battery from the line source power.

A second function performed by isolation switch 40 is concerned with the timing necessary to insure proper switching from normal mode to backup mode. The simultaneous presence of AC voltage on windings 30 and 46 must be avoided to prevent excessive current flows. Excessive current would result because the chopped DC voltage available thru connector 44 would not be at the same frequency as the AC voltage available from the line voltage source. If these voltages are present in the windings of the transformer at the same time there will be instances when both voltages will be out of phase. At this time the windings would appear as short circuits to each other causing excessive currents to flow and triggering short circuit sensor 20 or damaging other components.

For this reason it is necessary to insure that DC/DC converter 42 is not activated until after isolation switch 26 has been opened when going from a normal mode of operation to the backup mode. In addition, of course, it is also necessary that isolation switch 40 open before the line voltage is applied to winding 30 thru connector 12 by isolation switch 26. The use of backup switch 28 to activate backup unit relay 38 which in turn closes switch 40 provides the necessary time lags, that is, a break before make function.

Timing is also important with regard to short circuit sensor 20 and disabling switch 22. If increased line current is present due to a short circuit, sensor 20 opens switch 22 disabling the backup unit. However, when the line voltage drops, line voltage detector 24 causes isolation switch 26 to open. This might disconnect the short circuit from the AC line source there by reducing line current. Short circuit sensor 20, therefore, must be a circuit breaker type detector rather than a relay. That is, once an increased current is detected disabling switch 22 must remain open until reset by an operator or repairman. Otherwise, a drop in the line voltage would drop the line current and the system would oscillate between the AC source and the battery. It is apparent from the foregoing description that the single battery voltage in the backup unit may be used to provide various system power voltages as required. In fact, the secondary of the main power transformer provides the same system power, including both positive and negative voltages, whether the primary windings are excited by AC or chopped DC. This is a distinct advantage in large systems.

It must be noted that although the invention was described in terms of a preferred embodiment, modifications may be made therein by persons having still in this art without departing from the spirit or scope of the invention as defined by the following claims.

I claim:

1. A power supply with backup capabilities for supplying several voltage levels of system power, comprising: a main power transformer having two primary and one secondary windings; means connected to the secondary winding for rectifying and regulating the transformer output; means for applying AC voltage to the first primary winding during the normal mode of operation of the power supply; and means for applying chopped DC voltage to the second primary winding during the backup mode.

2. The power supply claimed in claim 1 further comprising: means to detect line voltage failure; and
   means to automatically activate the backup mode upon detection of line voltage failure.

3. The power supply claimed in claim 2 further comprising: means to disable the backup mode upon detection of a line voltage drop due to the loading effect of a short circuit.

4. The power supply claimed in claim 2 further comprising: a short circuit sensor for disabling the backup mode if line current increases above a predetermined maximum.

5. The power supply claimed in claim 1 wherein the DC means includes: a battery; and DC/DC converter means for converting the battery voltage to a chopped DC voltage.

6. The power supply claimed in claim 5 wherein the AC means further includes: line voltage detecting means for detecting line voltage above a predetermined minimum; and isolation switch means activated by the line voltage detecting means for applying AC voltage to the first primary winding when line voltage is detected above the minimum.

7. The supply claimed in claim 6 wherein the DC means further includes: short circuit detecting means for detecting an increase of line current above a predetermined maximum;
   disabling switch means activated by the short circuit means to open when line current above the maximum is detected; activation switch means in series with the disabling switch means activated by the line voltage detecting means to close when line voltage below the minimum is detected; and isolation relay means to activate the backup mode when the activation switch means and the disabling switch means are both closed.

8. The power supply claimed in claim 1 further comprising: means to prevent the simultaneous application of the AC voltage and the DC voltage to the main power transformer.

* * * * *